April 28, 1931. A. S. HUGHES ET AL 1,802,428
TRACTOR FRAME MOUNTING
Filed Nov. 10, 1927
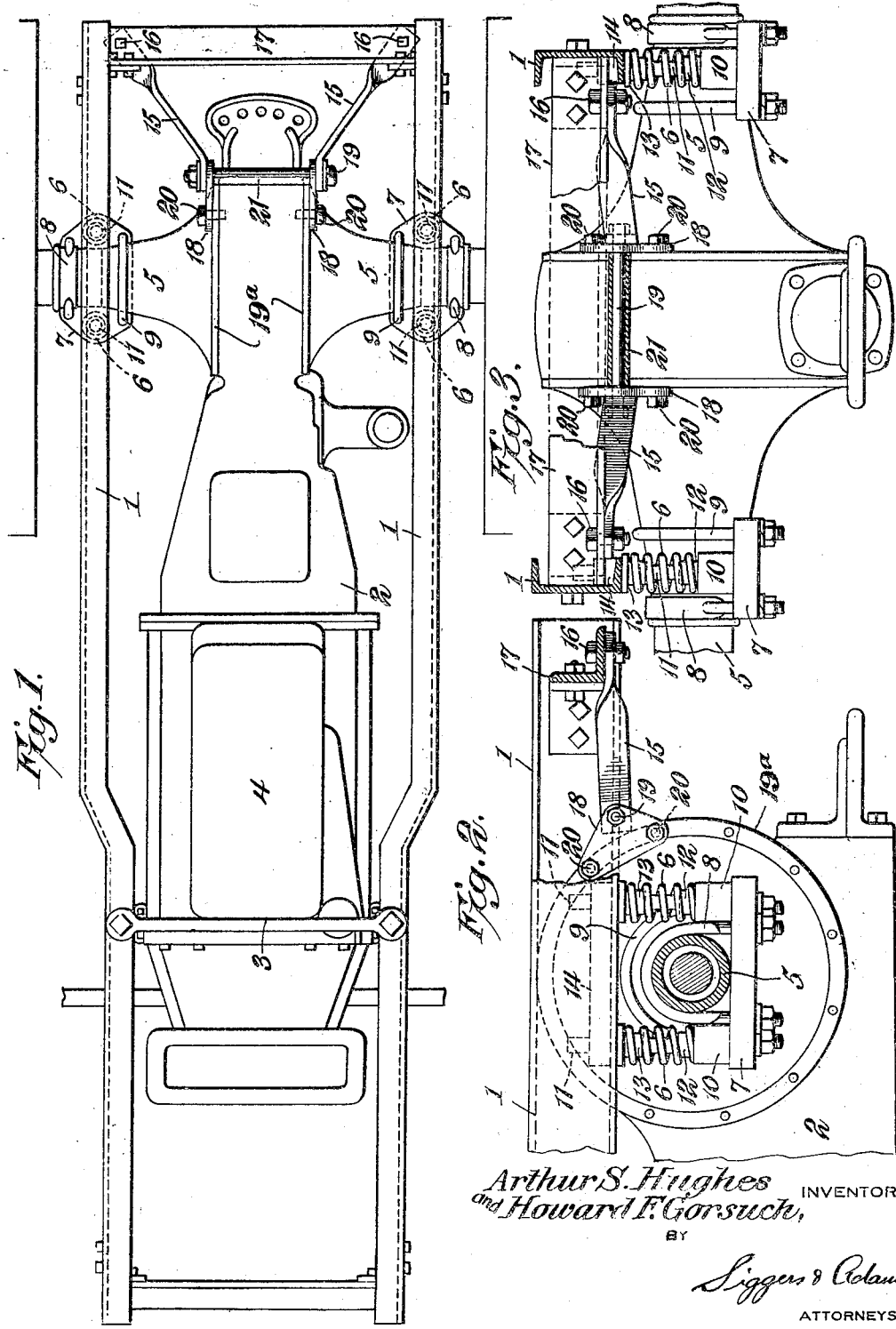
Arthur S. Hughes
and Howard F. Gorsuch, INVENTORS
BY
Siggers & Adams
ATTORNEYS Patented Apr. 28, 1931

1,802,428

UNITED STATES PATENT OFFICE

ARTHUR S. HUGHES AND HOWARD F. GORSUCH, OF MANSFIELD, OHIO, ASSIGNORS TO THE HUGHES-KEENAN COMPANY, OF MANSFIELD, OHIO, A CORPORATION OF OHIO

TRACTOR-FRAME MOUNTING

Application filed November 10, 1927. Serial No. 232,389.

This invention relates to means for preventing lateral movement in load-supporting frames which are superimposed upon tractors or other self-propelled vehicles and provided with resilient means for cushioning the same to protect the tractor from severe jars or jolts; and among other objects, the invention aims to provide braces which may be readily applied to the frame and to the transmission housing of the tractor, without alteration thereof, to hold the frame effectually against any longitudinal or transverse movement while freely permitting the up and down cushioning action.

This application is a companion to another application filed by us on even date herewith, Serial No. 232,388.

In the accompanying drawings, wherein the preferred embodiment of the invention is illustrated:

Fig. 1 is a plan view showing the improved bracing means applied to a frame superimposed upon a tractor;

Fig. 2 is a fragmentary side view showing the resilient mounting of the frame upon the rear end of the tractor together with the improved bracing means, parts being shown in vertical section;

Fig. 3 is a rear end elevation of the same, parts being shown in vertical section.

The present demand for small, easily maneuvered vehicles having compact, self-contained material-handling or conveying machinery or equipment has caused such machinery to be mounted directly upon the frames of agricultural tractors, such as the Fordson tractor, to be carried thereby. Rigid connections between the superimposed frame and such a tractor have been found to cause serious damage to the working parts of the tractor (which is designed merely for hauling an implement over relatively soft ground) because of travel over hard roads, and the severe jolts and jars imparted by the operations of the apparatus mounted thereon, or the movements of a dump body during loading and unloading. By properly cushioning the frame upon the tractor, by means of suitably disposed springs or the like, such strains are absorbed and the tractor guarded against damage with a resultant greater efficiency and longer life.

Referring more particularly to the drawings, there is shown a frame comprising spaced, parallel side bars 1 which are preferably formed of channel irons arranged with their flanges extending inwardly and suitably connected together at their ends to form a strong and rigid structure for supporting a dump body, or hoisting or other apparatus, or for carrying a platform. For the reasons set forth, the frame may be secured to and supported by resilient means indicated at 3 in Fig. 1, said showing being indicative of the subject matter disclosed in our co-pending application for patent, Serial No. 232,387. Such resilient support, briefly, comprises a saddle having coiled springs in connection therewith for cushioning the frame at the radiator end of the tractor, the said saddle being adapted to rest directly upon the cylinder block of the tractor adjacent the motor 4.

The opposite end of the frame is adapted to be supported upon the axle housing 5 of the tractor through compression springs 6 which bear at their upper ends against the under side of the channels 1 and are supported at their lower ends upon a supporting plate 7 which extends longitudinally of the frame and is clamped transversely beneath the adjacent axle housing 5 by means of outer and inner clips 8, 9 respectively. The plate 7 is preferably formed at its ends with upstanding heads 10 formed integrally therewith and provided with vertical sockets in which are seated guide pins 11, the latter extending upwardly through the springs 6 which are held from lateral movement at their lower ends by tubular extensions 12 of the blocks 10 and at their upper ends by flanged collars 13 which bear against the under sides of the side bars 1. The upper ends of the pins 11 extend through apertures in the lower flanges of the channel irons and through similar apertures formed in the ends of a strengthening plate 14 which is secured upon the upper face of said lower flange in any suitable manner. This manner of resiliently mounting the end of the superimposed frame upon the rear end of the tractor is fully disclosed in our co-pending application, Serial No. 232,388 and is claimed herein only insofar as it forms a true patentable combination with other parts to be described.

While the pins 11, where passing through the aforesaid apertures in the upper plates 14 and sliding vertically through the same during cushioning action, will serve to prevent a certain amount of lateral play in the superimposed frame, it is not sufficient to prevent breakage, where the machine is subjected to very heavy duty, and hence the present invention has to take care of extreme side pressure upon the frame and to guard against straining of the tractor parts.

To this end, braces 15, which are preferably formed of heavy strap steel, are connected to the frame and tractor unit and are located substantially horizontal and edgewise, at substantially 45° to the longitudinal axis of the tractor, as viewed in plan, Fig. 1. One of the terminals of each brace 15 is given a twist to provide an attaching portion which is connected by a bolt 16 to the under side of the cross bar 17 of the superimposed frame and adjacent to the connection thereof with the side bars 1. The other ends of the braces 15 are bent to extend longitudinally of the tractor unit and are loosely connected to the outer faces of attaching plates 18, preferably of triangular form (see Fig. 2) by means of a tie bolt 19 traversing the plates 18. The plates 18 are secured to the circumferential flanges 19a of the rear axle housings 5 by means of bolts 20 spaced apart the proper distance to fit in two of the usual holes for the bolts which rigidly fasten said housings to the transmission housing of the tractor. In order to distribute the strain equally between the plates 18, a spacing sleeve 21 is preferably mounted around the tie bolt 19 and as the frame rocks, the braces rock about the bolt 19 in an obvious manner.

From the foregoing it will be seen that strong but simple means have been provided which may be applied to a tractor without necessitating any change in the latter, effectually to prevent longitudinal as well as side movement in a superimposed frame or similar structure while permitting the same to move up and down freely to a limited extent relative to the tractor as in the above described cushioning action.

Obviously the present invention is not restricted to the embodiment thereof herein shown and described.

What is claimed is:—

1. The combination with a tractor, of a frame superimposed thereon having two longitudinal members; means for connecting the frame and the front end of the tractor; resilient means for connecting the rear end of the frame to the rear axle housings of the tractor to permit said frame to move up and down thereon; and a pair of brace bars rigidly connected to the rear end of the frame and to the tractor to prevent any lateral movement of the frame relative to the tractor; said brace bars extending at acute angles to the longitudinal members of the frame, and permitting limited vertical movement of the frame on the tractor.

2. The combination with a tractor, of a frame superimposed thereon; means for connecting the frame and the front end of the tractor; resilient means for connecting the rear end of the frame to the rear axle housings of the tractor to permit said frame to move up and down thereon; attaching plates adapted to be secured to the circular flanges of the rear axle housings where connected to the transmission housing of the tractor; brace bars rigidly connected at their rear ends to the corners of the frame and extending inwardly and forwardly at opposite angles, the forward ends being bent longitudinally of the tractor; a pivotal bolt traversing the plates and the ends of the brace arms to permit the latter to swing up with the frame; and a spacing sleeve surrounding the bolt and bearing at its ends against the plates.

3. The combination with a tractor, of a substantially rectangular frame superimposed thereon; means for connecting the frame and the front end of the tractor; resilient means for connecting the rear end of the frame to the rear axle housings of the tractor to permit said frame to move up and down thereon; attaching plates connected to the rear end of the tractor; brace bars each having one end rigidly connected to the adjacent end of the frame and the other end connected to one of the attaching plates to permit limited up and down motion while substantially preventing longitudinal or transverse motion of the frame relative to the tractor; said brace bars lying in a substantially horizontal plane at substantially 45° to the longitudinal axis of the frame and secured thereto adjacent the corners of the frame.

In testimony that we claim the foregoing as our own, we have hereto affixed our signatures.

ARTHUR S. HUGHES.
HOWARD F. GORSUCH.